(12) United States Patent
Tai (10) Patent No.: US 7,603,901 B1
(45) Date of Patent: Oct. 20, 2009

(54) THERMAL LIQUID CONTAINER HAVING LIQUID LEVEL INDICATOR

(76) Inventor: Yuen Wa Tai, Flat B, 8/F, Block 19, City One, Shatin, Hong Kong (HK)

( * ) Notice: Subject to any disclaimer, the term of this patent is extended or adjusted under 35 U.S.C. 154(b) by 0 days.

(21) Appl. No.: 11/639,448

(22) Filed: Dec. 15, 2006

(51) Int. Cl.
*G01F 23/30* (2006.01)

(52) U.S. Cl. .................................................. 73/323

(58) Field of Classification Search ............ 73/323, 73/322, 290 R, 305
See application file for complete search history.

(56) References Cited

U.S. PATENT DOCUMENTS 3,060,717 A * 10/1962 Howe ........................... 73/1.73
3,336,856 A * 8/1967 Martin ......................... 99/288
4,638,928 A * 1/1987 Webster ....................... 222/155

2003/0037613 A1 * 2/2003 Mulrooney et al. ........... 73/323

* cited by examiner

*Primary Examiner*—Hezron Williams
*Assistant Examiner*—Gunnar J Gissel (57) ABSTRACT

A container for holding liquids. The container has a body having an interior for holding a liquid, an exterior surface, and an upper portion defining a central opening and a spout. A handle is attached to the body at a first predetermined location. A liquid level indicator is attached to the body at a second predetermined location that is a predetermined distance from the first predetermined location. The liquid level indicator has a liquid passageway therethrough which is in fluid communication with the interior of the body. The liquid level indicator has a first end attached to the body, a second end attached to the body, and a substantially transparent portion between the first and second ends. The substantially transparent portion is spaced apart from the exterior surface of the body by a predetermined distance. In one embodiment, the body has a generally circular shape and the liquid level indicator is about 90° from the handle.

12 Claims, 8 Drawing Sheets

THERMAL LIQUID CONTAINER HAVING LIQUID LEVEL INDICATOR

BACKGROUND OF THE INVENTION

1. Field of the Invention

The present invention generally relates to a thermal, liquid container.

2. Description of the Related Art

Thermal liquid containers, such as thermal carafes, thermoses, or thermal beverage containers, are known in the art. Thermal carafes are described in U.S. Pat. Nos. 5,968,618 and 6,505,752. Such thermal liquid containers maintain the temperature of liquids contained therein for a predetermined amount of time.

SUMMARY OF THE INVENTION

It is an object of the present invention to provide a new and improved thermal liquid container.

Other objects and advantages of the present invention will be apparent from the ensuing description.

Thus, the present invention is directed to, in one aspect, a container for holding liquids. The container comprises a body having an interior for holding a liquid, an exterior surface, and an upper portion defining a central opening and a spout. A handle is attached to the body at a first predetermined location. A liquid level indicator is attached to the body at a second predetermined location that is a predetermined distance from the first predetermined location. The liquid level indicator has a liquid passageway therethrough which is in fluid communication with the interior of the body. The liquid level indicator has a first end attached to the body, a second end attached to the body, and a substantially transparent portion between the first and second ends. The substantially transparent portion is spaced from the exterior surface of the body by a predetermined distance. The substantially transparent portion has indicia thereon which correspond to amounts of liquid that may be in the interior of the container. A display sphere is located within the substantially transparent portion and floats upon the liquid within the substantially transparent portion. The position of the display sphere with respect to the indicia indicates the amount of liquid within the interior of the container. In one embodiment, the body of the container has a generally circular shape and the liquid level indicator is between about 45° and 180° from the handle. The container also includes a removable cover that covers the central opening.

In a related aspect, the present invention is directed to a thermal carafe, comprising a body having an exterior shell constructed from a thermally insulating material, an interior shell defining an interior for holding a liquid, an insulating cavity providing insulation between the exterior shell and the interior shell, and an upper portion defining a central opening and a spout. The thermal carafe also includes a handle attached to the exterior shell at a first predetermined location, and a liquid level indicator attached to the exterior shell at a second predetermined location that is a predetermined distance from the first predetermined location. The liquid level indicator has a liquid passageway therethrough which is in fluid communication with the interior of the interior shell. The liquid level indicator has a first end attached to the exterior shell, a second end attached to the exterior shell, and a substantially transparent portion between the first and second ends. The substantially transparent portion is spaced from the exterior shell by a predetermined distance. The substantially transparent portion has indicia thereon to indicate specific amounts of liquid that may be within the interior of the interior shell. A floating member floats upon the liquid in the substantially transparent portion. The position of the floating member with respect to the indicia indicates the actual amount of liquid within the interior of the interior shell. In one embodiment, the body has a generally circular shape and the liquid level indicator is located between about 45° and 180° from the handle. In one embodiment, the thermal carafe includes a liquid outlet for allowing liquid to flow from the interior of the interior shell. When the liquid outlet is closed, liquids are retained within the interior of the interior shell and do not flow from the interior of the interior shell. When the liquid outlet is open, the liquids flow from the interior of the interior shell and flow through the liquid outlet. The thermal carafe also includes a rotatable cover that covers the central opening.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1:
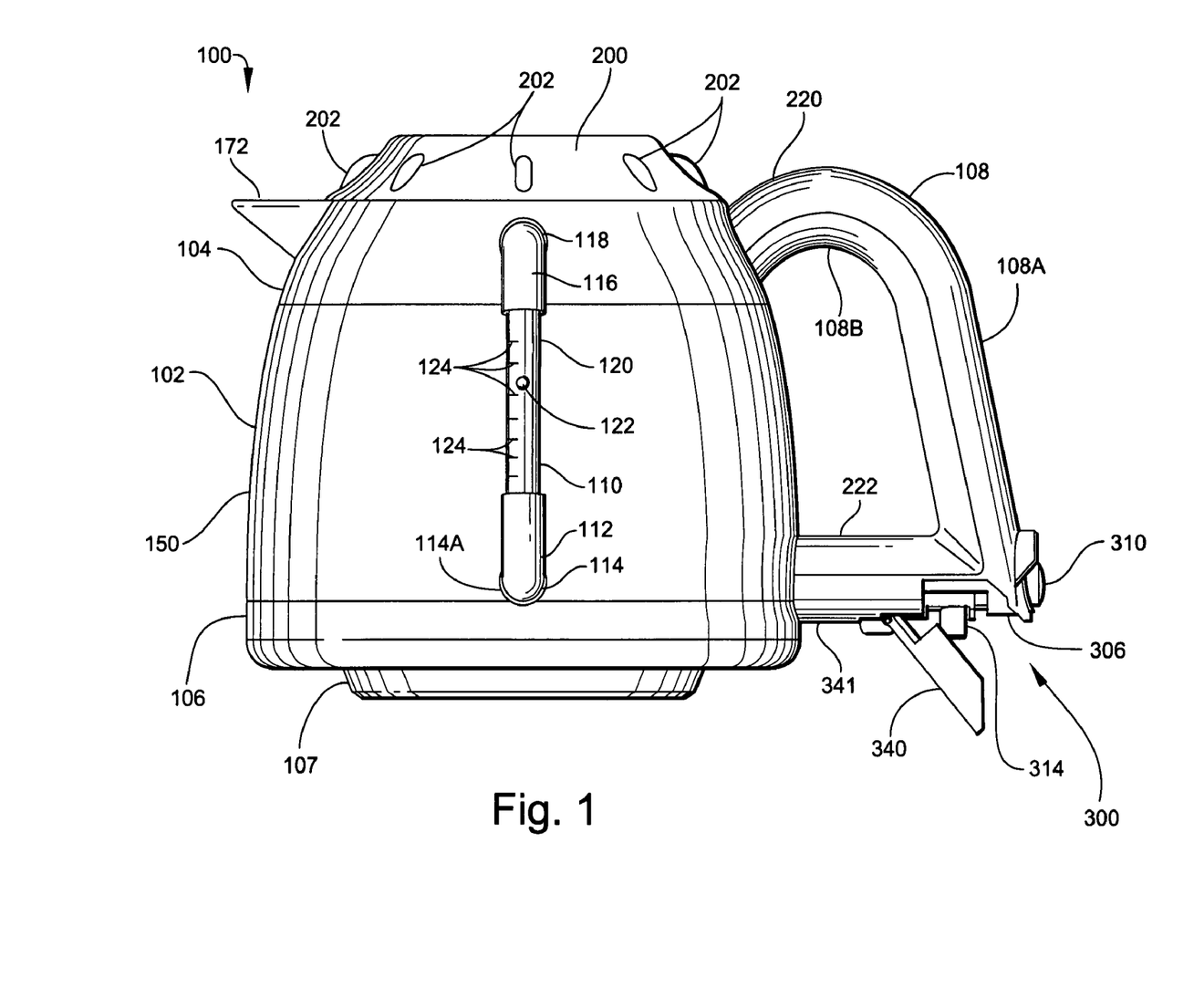
FIG. 1 is a side elevational view of a thermal liquid container in accordance with one embodiment of the present invention.

Referring to FIG. 1, there is shown a thermal carafe 100 in accordance with one embodiment of the invention. Thermal carafe 100 generally comprises body 102 which has an upper portion 104, lower portion 106 and a base 107. Base 107 is shaped to allow placement thereof on a heat plate or other heat generating surface. In a preferred embodiment, body 102 has a generally circular shape. Thermal carafe 100 comprises handle 108 which is comprised of handle cover 108A and inner handle structure 108B. Thermal carafe 100 further includes liquid level indicator 110. In a preferred embodiment, liquid level indicator 110 is located between about 45° and 180° from handle 108. In one embodiment, liquid level indicator 110 is located about 90° from handle 108. At such a location, liquid level indicator 110 is highly visible and a user can quickly determine the level of liquid in thermal carafe 100. However, it is to be understood that liquid level indicator 110 can be located less than 45° from handle 108 or more than 180° from handle 108. It is also to be understood that body 102 can be configured to have a shape other than circular.

Figure 2:
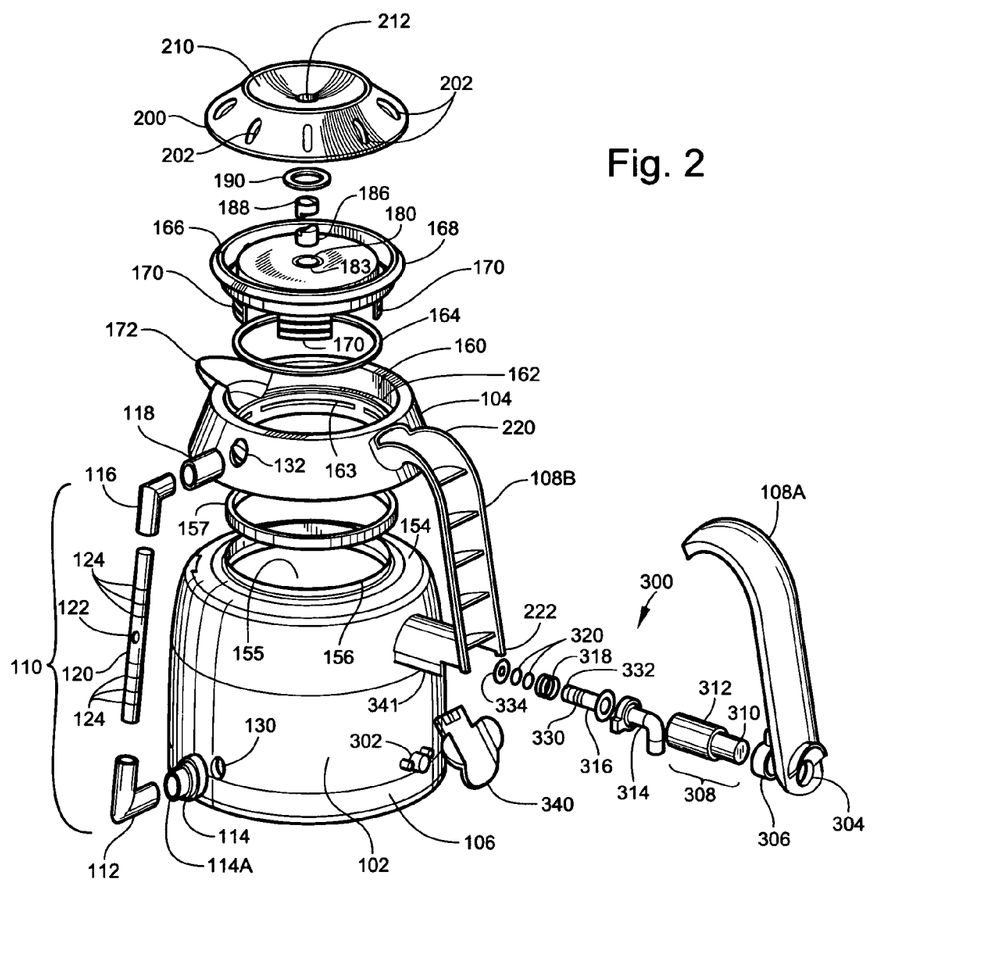
FIG. 2 is an exploded view of the thermal liquid container of FIG. 1.
Figure 3:
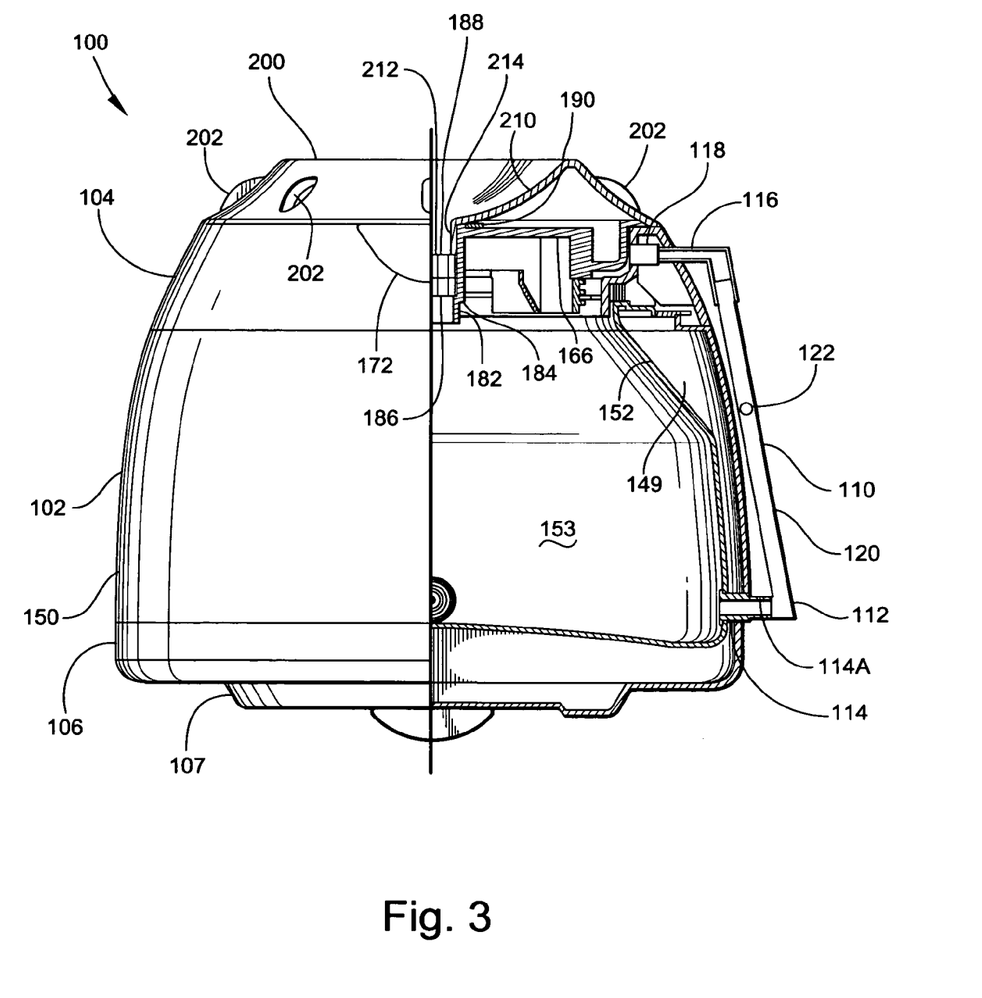
FIG. 3 is a front elevational view, partially in cross-section, of the thermal liquid container of FIG. 1.

Referring to FIGS. 1-4, liquid level indicator 110 generally comprises tube section 112 and fitting 114. Fitting 114 has portion 114A. Liquid level indicator 110 further includes tube sections 116 and 118, and indicator tube 120. Indicator tube 120 is substantially transparent. In a preferred embodiment, indicator tube 120 is fabricated from transparent plastic. In this embodiment, indicator tube 120 is of substantially straight construction. Display sphere 122 is located within indicator tube 120 and floats upon liquid in indicator tube 120. Indicator tube 120 has indicia 124 thereon which indicate specific amounts of liquid that may be within interior 153 (see FIG. 3) of thermal carafe 100. The position of display sphere 122 with respect to indicia 124 provides an indication of the actual amount of liquid within interior 153. As shown in FIGS. 2 and 3, tube section 114 is actually located within interior 153 and has portion 114A protruding through opening 130. Tube section 112 is connected to portion 114A of tube section 114. Indicator tube 120 is connected to and between tube sections 112 and 116. Tube section 116 is connected to tube section 118. Tube section 118 is connected to opening 132 in upper portion 104 of body 102. Thus, liquids can flow from interior 153 through fitting 114, tube section 112, indicator tube 120, and tube sections 116 and 118. Indicator tube 120 has a protrusion or tab therein (not shown) to prevent display sphere from flowing out of indicator tube 120 and into interior 153.

Figure 4:
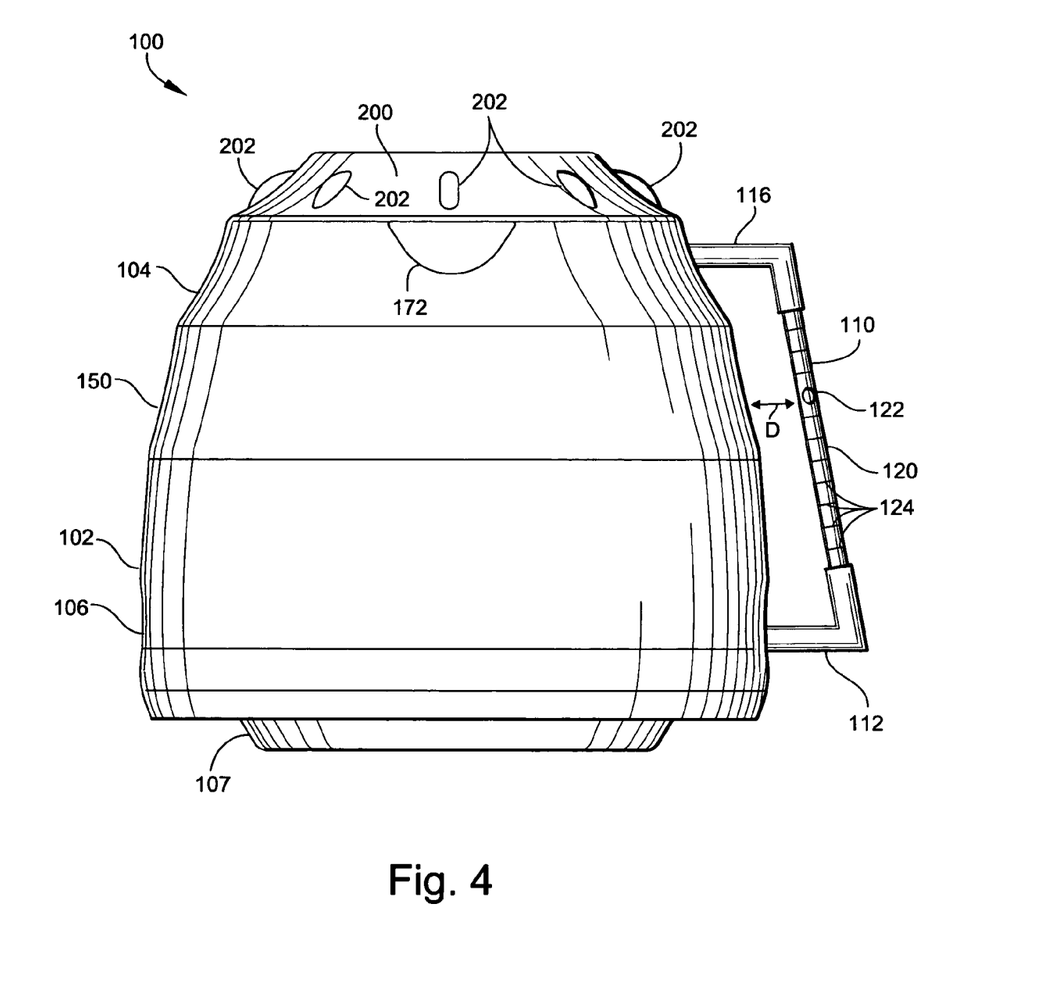
FIG. 4 is a front elevational view of the thermal liquid carafe of FIG. 1.

As shown in FIGS. 3 and 4, indicator tube 120 is not directly connected to body 102 and thus, does not directly contact body 102. In a preferred embodiment, indicator tube 120 is spaced from body 102 by a distance D. For example, in one embodiment, the distance D is between about 0.125 inch and 2.0 inches. However, this is just an example and it is to be understood that distance D can be less than 0.125 inch or more than 2.0 inches. Preferably, the distance D is suitable to allow cleaning of the portion of body 102 that is near indicator tube 120. Another advantage of indicator tube 120 not being embedded in or integral with body 102 is that the structural integrity of body 102 is not diminished or significantly altered. Another advantage is that the distance D facilitates cleaning of the body 102. In an alternate embodiment, tube section 116 is removably attached to fitting 118 and tube section 112 is removably attached to tube section 114. This alternate configuration allows indicator tube 120 to be removed and cleaned, or replaced.

Figure 5:
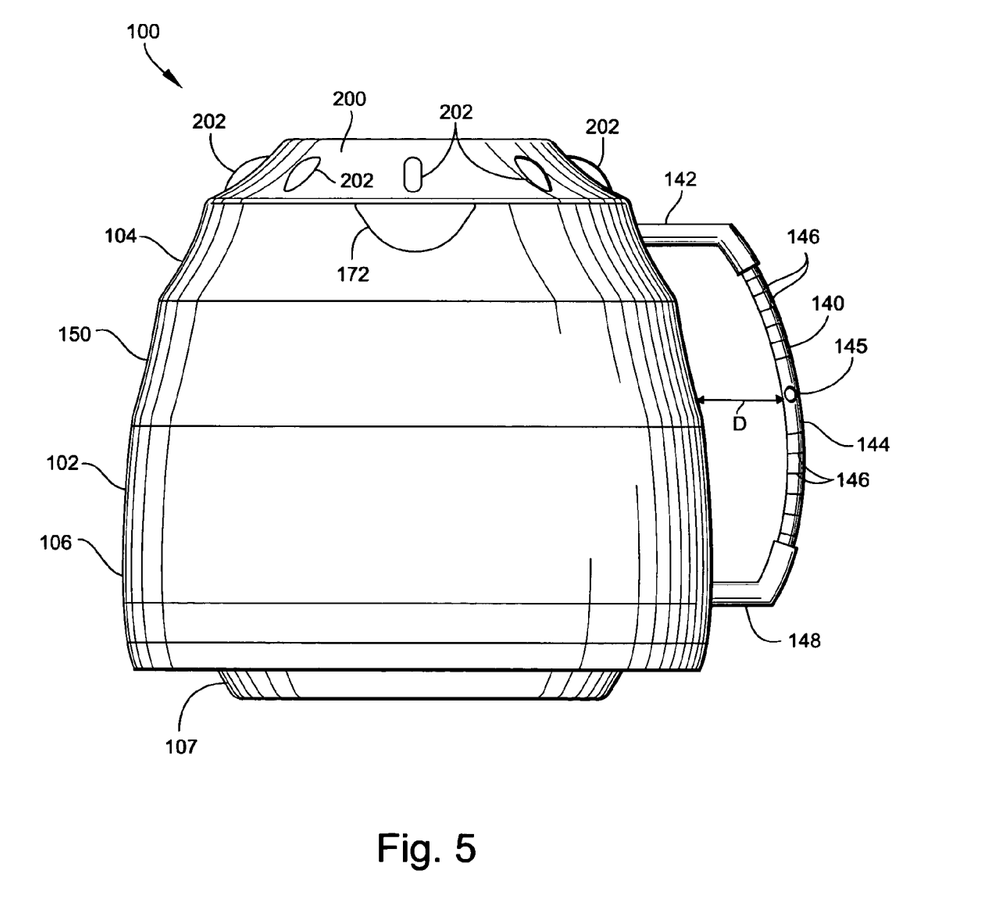
FIG. 5 is a view, similar to FIG. 4, that shows another embodiment of a liquid level indicator.

In an alternate embodiment, the liquid level indicator has a curved or arcuate geometry. Such a configuration is shown as liquid level indicator 140 in FIG. 5. Liquid level indicator 140 includes tube section 142 that is in liquid communication with interior 153 of thermal carafe 100. Liquid level indicator 140 includes indicator tube 144 that is connected to tube section 142. In accordance with this embodiment, indicator tube 144 has a curved or arcuate shape. Indicator tube 144 includes display sphere 145 which has the same function as display sphere 122 (see FIG. 3). Indicator tube 144 is substantially transparent. In a preferred embodiment, indicator tube 144 is fabricated from transparent plastic. Liquid level indicator 140 includes indicia 146 thereon that indicate an amount of liquid in thermal carafe 100. Liquid level indicator 140 includes tube section 148 which is in fluid communication with interior 153 of thermal carafe 100.

Figure 6:
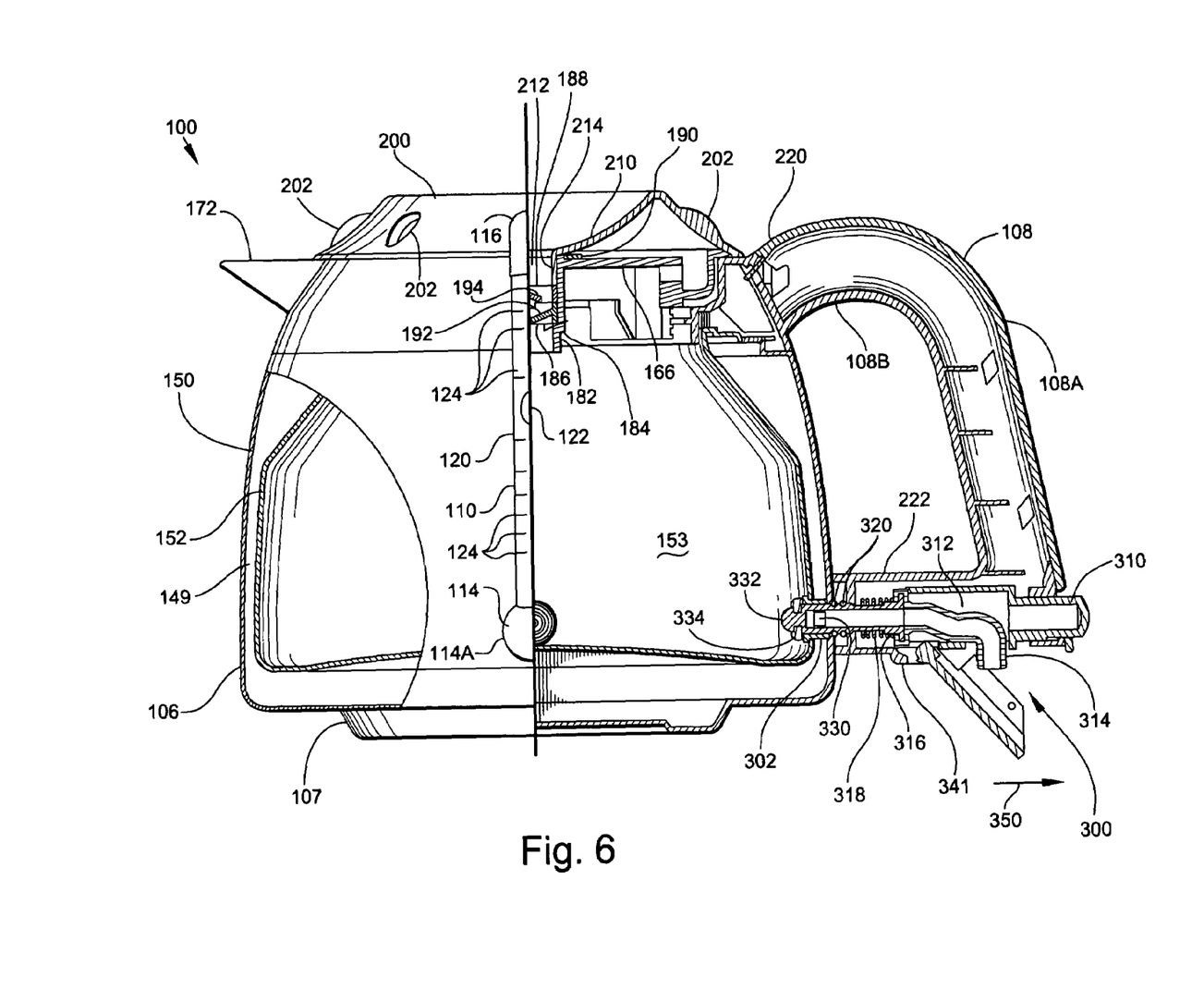
FIG. 6 is side elevational view, partially in cross-section of the thermal liquid container of FIG. 1, the view showing the structure of a liquid outlet that can be configured either in an open state to allow liquids in the interior of the thermal liquid container to flow out of the liquid outlet or a closed state to keep liquids in the interior of the thermal liquid container, the liquid outlet being shown in a closed state.
Figure 7:
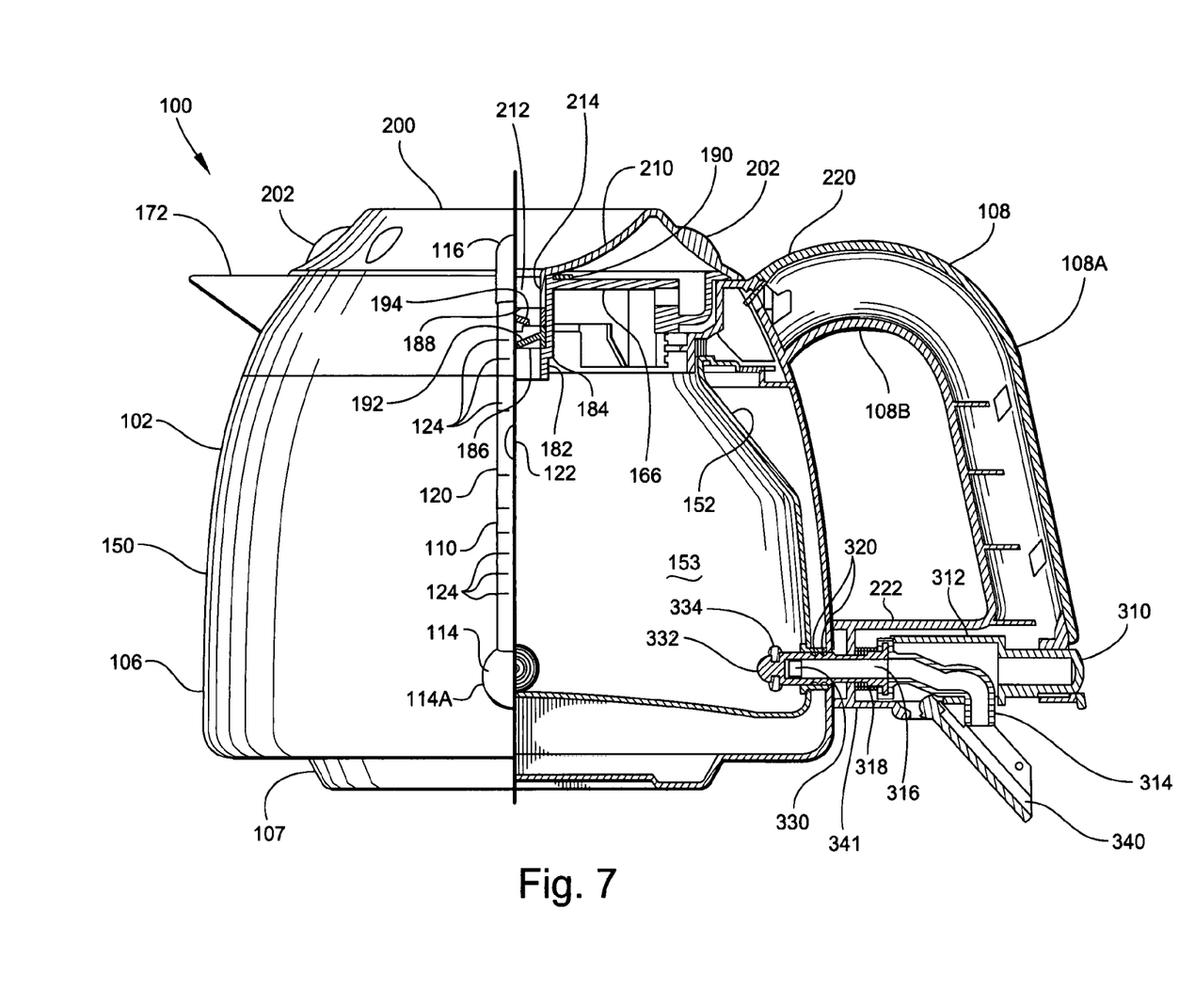
FIG. 7 is side elevational view, partially in cross-section, of the thermal liquid container of FIG. 1, showing the liquid outlet in an open state so as to allow liquids in the interior of the thermal liquid container to flow through the liquid outlet.

Referring to FIGS. 3, 6 and 7, body 102 generally comprises exterior shell 150 and interior shell 152. Exterior shell 150 is fabricated from thermally insulating material. One suitable thermally insulating material is a heat resistant plastic such as polyetherimide, polysolphone, or polycarbonate. Preferably, the heat resistant material is capable of withstanding temperatures between about 300° and 400° Fahrenheit. In a preferred embodiment, the thermally insulating material is opaque. Other suitable materials may be used as well, such as ceramic or stainless steel.

In one embodiment, thermal carafe 100 has an insulating cavity 149 between exterior shell 150 and interior shell 152. Insulating cavity 149 provides insulation between exterior shell 150 and interior shell 152. Specifically, insulating cavity 149 provides an insulating barrier to reduce or restrict heat transfer from the liquid contained with interior 153 to exterior shell 150. In an alternate embodiment, insulating cavity 149 is evacuated to a pressure less than atmospheric pressure. In another embodiment, insulating cavity 149 is filled with an insulating material (not shown) but known in the art. Such suitable insulating materials include aerogel.

Interior shell 152 defines the interior 153 that holds liquids therein. Preferably, exterior shell 150 is fabricated from any of the heat resistant plastics described in the foregoing description. In a preferred embodiment, the heat resistant plastic is opaque. Base 107 is fabricated from a material that allows base 107 to be placed on hot surfaces such as a heating plate on a coffee maker, or stove. Such materials are known in the art and are therefore, not discussed herein.

Referring to FIG. 2, in accordance with one embodiment of the invention, upper portion 104 is initially a separate section that is joined to the remaining portion of body 102 during the manufacture of thermal carafe 100. Such a configuration results in reduced manufacturing costs. In such an embodiment, body 102 has top end 154 that defines central opening 155. Upstanding lip 156 extends around central opening 155. Annular seal member 157 is fitted around lip 156 and provides a sealed relationship between upper portion 104 and the remaining portion of body 102. Annular seal member 157 is fabricated from a material that provides a water-tight connection. In one embodiment, annular seal member 157 is fabricated from silicone. In an alternate embodiment, upper portion 104 is not initially a separate component but is integral with the remaining portion of body 102.

Referring to FIGS. 1-4, upper portion 104 of body 102 has central opening 160 and a circumferentially extending shoulder 162 located within central opening 160. Shoulder 162 is contiguous with circumferentially extending wall 163. Annular seal member 164 is supported by shoulder 162. Valve body 166 is positioned within central opening 160 and is configured to rotate while disposed within central opening 160. Annular seal member 164 is positioned between peripheral portion 168 of valve body 166 and shoulder 162. Valve body 166 has downwardly extending sections 170 that extend downward into central opening 160 and confront wall 163. Upper portion 104 defines spout 172 from which liquids pour when a user tilts thermal carafe 100 at an appropriate angle. Valve body 166 can be rotated so that any of the downwardly extending sections 170 close off or block spout 172 in order to preventing liquids from being poured from the thermal carafe 100. In an alternate embodiment, there is slight frictional contact between downwardly extending sections 170 and vertical wall 163. However, the degree of friction between downwardly extending sections 170 and vertical wall 163 does not prevent valve body 166 from being rotated.

Referring to FIGS. 2, 3 and 6-8, valve body 166 comprises a central opening 180 and a downwardly extending tube section 182. Tube section 182 is in fluid communication with central opening 180. Valve body 166 includes lip 183 that extends around central opening 180. Tube section 182 has shoulder 184 therein. Valve body 166 includes valve sections 186 and 188 that are disposed in tube section 182. Valve section 186 is supported by shoulder 184. Valve section 188 is supported by valve section 186. Valve body 166 includes annular gasket member 190 that is positioned about lip 183 (see FIG. 8). Valve section 186 has a slanted inner surface 192. Similarly, valve section 188 has a slanted, inner surface 194. The purpose of slanted, inner surfaces 192 and 194 is discussed in the ensuing description.

Referring to FIGS. 1-3 and 6-8, thermal carafe 100 further includes cover 200 which has a plurality of protruding ribs 202 which provide a user with a better grip for rotating cover 200. In a preferred embodiment, carafe cover 200 can rotate 360 degrees. As will be explained in the ensuing description, cover 200 is attached to valve body 166 in such a manner that rotation of cover 200 causes rotation of valve body 166. Thus, rotating cover 200 to one position causes spout 172 to be blocked by one of the downwardly extending members 170, and rotating cover 200 to another position moves the downwardly extending member 170 away from spout 172.

Figure 8:
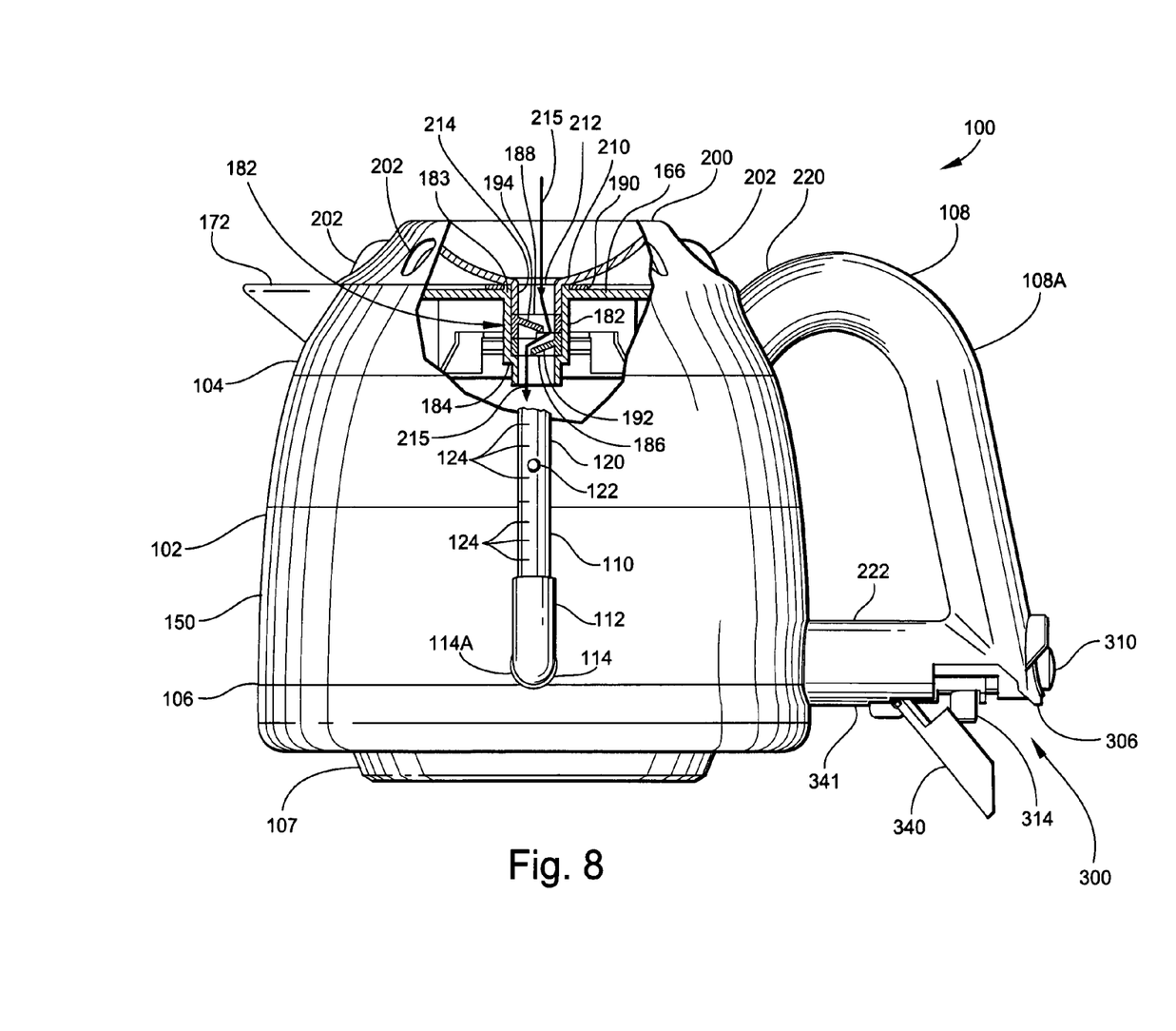
FIG. 8 is a side elevational view, partially in cross-section, of the thermal liquid container of FIG. 1, the view showing the structure of a cover and valve body depicted in FIG. 2.

Referring to FIGS. 2 and 8, cover 200 has a generally concave surface 210 and central opening 212 which cooperate to provide a funnel-like function. Cover 200 comprises downwardly extending tube section 214 that is in fluid communication with central opening 212. Tube section 214 extends through central opening 180 of valve body 166 and frictionally contacts the inner wall of tube section 182 of valve body 166. The degree of frictional contact between tube section 214 and the inner wall of tube section 182 is such that when a user rotates cover 200, valve body 166 will rotate with cover 200. Liquids, such as coffee, tea or water, pass through central opening 212, liquid outlet 214 and valve sections 188 and 186, and into interior 153. Arrow 215 (see FIG. 8) illustrates the flow of liquids. The slanted sections 192 and 194 of valve sections 186 and 188, respectively, provide for a controlled, even flow of the liquids and prevent liquid from splashing upward through central opening 212 when liquids are being poured into interior 153.

Referring to FIGS. 1, 2 and 6-8, handle 108 has upper portion 220 and lower portion 222 that are attached to body 102. Thermal carafe 100 further comprises a liquid outlet generally indicated by the reference number 300 which is located at lower portion 222 of handle 108. Liquid outlet 300 allows a user to drain liquids from interior 153. Fluid port 302 is in fluid communication with interior 153. The purpose of fluid port 302 is explained in the ensuing description. Handle cover 108A has a bottom portion that defines through-hole 304. Handle cover 108A has sleeve 306 that is aligned with through-hole 304. Liquid outlet 300 includes push-button assembly 308 that comprises button portion 310 and housing portion 312. A portion of housing portion 312 is positioned within sleeve 306 such that button portion 310 protrudes through through-hole 304. Push-button assembly 308 moves axially and can move toward or away from body 102 of thermal carafe 100. Housing portion 312 is cut away in the rear and underside so as to receive liquid outlet tube 314. Liquid outlet 300 further includes shaft 316 that has a bore therethrough for the flow of liquids. Shaft 316 is in fluid communication with liquid outlet tube 314. Spring 318 is positioned about shaft 316. Annular seal members 320 are positioned about shaft 316 to provide a watertight seal.

Referring to FIGS. 1, 2 and 6-8, shaft 316 has an inlet 330 formed therein which is in fluid communication with the bore through shaft 316. Shaft 316 also includes an end portion 332 that defines a circumferentially extending channel that receives ring member 334. The purpose of ring member 334 is discussed in the ensuing description. Liquid outlet 300 further includes outlet cover 340 that is pivotally attached to underside 341 of lower portion 222 of handle 108. Outlet cover 340 can be moved to an inclined position, as shown in FIG. 8, to allow liquids that drain from liquid outlet tube 314 to run downward. Outlet cover 340 can be moved upward to a raised position as well so as to cover liquid outlet tube 314. Liquid outlet 300 has an opened state and a closed state. In the opened state, liquids flow from interior 153 and through inlet 330, shaft 316 and outlet tube 314. In the closed state, liquids are retained within interior 153. Spring 318 normally urges shaft 316, liquid outlet tube 314 and push-button assembly 308 in the direction indicated by arrow 350 (see FIG. 6) so as to configure liquid outlet 300 in the closed state. In the closed state, inlet 330 of shaft 316 is not within interior 153 and sealing ring 334 abuts the portion of fluid port 302 that is within interior 153 so as to prevent end 332 of shaft 316 from moving out of interior 153. Referring to FIG. 7, when the user desires to configure liquid outlet 300 in the open state in order to drain liquid from interior 153, the user pivots liquid outlet cover 340 downward. Next, the user depresses push-button 310 so that liquid outlet tube 314 and shaft 316 are moved in a direction that is opposite to arrow 350. As a result, ring member 334 is moved away from its abutting relationship with the interior portion of fluid port 302 and inlet 330 of shaft 316 is positioned within interior 153. When this occurs, liquid enters inlet 330 and passes through shaft 316, and liquid outlet tube 314 and runs down liquid outlet cover 340.

Thus, the present invention provides a thermal liquid container that provides several features, benefits and advantages. The thermal liquid container of the present invention provides a liquid level indicator that can be viewed by a user from various angles. The thermal liquid container of the present invention can be used for multiple purposes such as a thermal coffee carafe for use with coffee makers, a thermal liquid container for storing liquids such as soups, coffee, tea, or other hot beverages, a thermal liquid container for storing cold liquids such as soda, water, or ice tea, or a thermal cooking pot that can be used on a stove.

The foregoing description of the preferred embodiments of the invention has been presented for purposes of illustration and description only. It is neither intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A container for holding liquids, comprising:
   a body having an interior for holding a liquid, an exterior surface, and an upper portion defining a central opening;
   a handle attached to the body at a first predetermined location, the handle comprising an upper portion, a bottom portion and a central portion located between the upper portion and bottom portion and configured to be grasped by a user, the bottom portion of the handle including means for draining liquid from the interior of the container, the means for draining liquid comprising a liquid outlet and means for configuring the liquid outlet in a closed state to retain liquids in the interior or an open state to drain liquids from the interior; and
   a liquid level indicator attached to the body at a second predetermined location that is a predetermined distance from the first predetermined location, the liquid level indicator having a liquid passageway therethrough which is in liquid communication with the interior of the body, the liquid level indicator having a first end attached to the body, a second end attached to the body, and a substantially transparent portion between the first and second end portions, the substantially transparent portion being spaced apart from the exterior surface of the body by a predetermined distance.

2. The container according to claim 1 wherein the body has a lower portion and an upper portion, the container further comprising a tube fitting that has a portion disposed within the interior and another portion that protrudes through the lower portion of the body, the first end of the liquid level indicator being connected to the portion of the tube fitting that protrudes through the lower portion of the body.

3. The container according to claim 2 wherein the second end of the liquid level indicator is connected to the upper portion of the body.

4. The container according to claim 1 wherein the substantially transparent portion is substantially straight.

5. The container according to claim 1 wherein the substantially transparent portion is curved.

6. The container according to claim 1 wherein the substantially transparent portion has indicia thereon to indicate a specific amount of liquid that may be in the container.

7. The container according to claim 6 wherein the liquid level indicator includes a display sphere that floats upon the liquid in the substantially transparent portion.

8. The container according to claim 1 wherein the body has a generally circular shape and the liquid level indicator is located between about 45° and 180° from the handle.

9. The container according to claim 8 wherein the liquid level indicator is about 90° from the handle.

10. The container according to claim 1 wherein the upper portion of the body defines a spout.

11. The container according to claim 1 wherein the body comprises an interior shell that defines the interior for holding liquids and wherein the body further comprises an exterior shell which has an exterior surface.

12. The container according to claim 1 further including a cover for covering the central opening.

\* \* \* \* \*